(12) United States Patent
Hawker et al.

(10) Patent No.: US 7,943,719 B2
(45) Date of Patent: May 17, 2011

(54) ENCAPSULATION RESINS

(75) Inventors: Craig J. Hawker, Santa Barbara, CA (US); Rosette G. Guino, Long Beach, CA (US); Keiichi Seki, Kanagawa-ken (JP); Kenichi Takizawa, Kitakyushu (JP); Yutaka Moti, Kitakyushu (JP)

(73) Assignees: The Regents of the University of California;, Oakland, CA (US); Mitsubishi Chemical Company, Tokyo (JP)

( * ) Notice: Subject to any disclaimer, the term of this patent is extended or adjusted under 35 U.S.C. 154(b) by 139 days.

(21) Appl. No.: 12/072,853

(22) Filed: Feb. 28, 2008

(65) Prior Publication Data

US 2009/0221783 A1  Sep. 3, 2009

(51) Int. Cl.
C08G 77/12 (2006.01)

(52) U.S. Cl. .................. 528/14; 528/31; 528/25

(58) Field of Classification Search .......... 528/31, 528/14, 25
See application file for complete search history.

(56) References Cited

U.S. PATENT DOCUMENTS

| | | | |
|---|---|---|---|
| 5,646,687 A | 7/1997 | Botsford, III et al. | |
| 5,658,494 A * | 8/1997 | Bell et al. | 252/301.18 |
| 6,204,523 B1 | 3/2001 | Carey et al. | |
| 6,590,235 B2 | 7/2003 | Carey et al. | |
| 6,686,676 B2 | 2/2004 | McNulty et al. | |
| 6,982,523 B2 * | 1/2006 | Odaki | 313/503 |
| 7,160,972 B2 | 1/2007 | Young et al. | |
| 7,241,852 B2 | 7/2007 | Walker et al. | |
| 7,261,441 B2 | 8/2007 | Ng et al. | |
| 2003/0162929 A1 * | 8/2003 | Verbruggen et al. | 528/10 |
| 2004/0063840 A1 | 4/2004 | Starkey | |
| 2006/0084282 A1 | 4/2006 | Dubois et al. | |

FOREIGN PATENT DOCUMENTS

| | | |
|---|---|---|
| EP | 1854831(A1) | 11/2007 |
| JP | A-2002-203989 | 7/2002 |
| JP | A-2004-356506 | 12/2004 |
| WO | WO2005/085303 | 9/2005 |
| WO | WO2006/055456 | 5/2006 |

OTHER PUBLICATIONS

Proc. of SPIE vol. 6192, 619202 (2006).
K. Tohi, et al., *Physica B*, 302, 268-276 (2001).

* cited by examiner

*Primary Examiner* — Kuo-Liang Peng
(74) *Attorney, Agent, or Firm* — Berliner & Associates

(57) ABSTRACT

Curable polyorganosiloxanes are provided that cure in the absence of a hydrosilylation catalyst. The cured polyorganosiloxanes have increased stability and can be used as encapsulation resin is at a temperature far lower than 300° C., have excellent light transmission properties (colorless transparency. in a wavelength region of from ultraviolet light to visible light, light resistance, heat resistance, resistance to moist heat and UV resistance, and do not generate cracks and peeling even in use over a long period of time.

10 Claims, 7 Drawing Sheets

TABLE 1

|  | Visual observation of cured product | Visual observation after first 260°C heating test | Visual observation after second 260°C heating test |
|---|---|---|---|
| Example 3 Resin A | Colorless | Peeling 0 in 3 | Peeling 0 in 3 |
| Example 4 Resin B | Colorless | Peeling 0 in 3 | Peeling 0 in 3 |
| Comparative Example 5 Resin C | Colorless | Peeling 0 in 3 | Peeling 1 in 3 |
| Comparative Example 6 Resin D | Colored in slightly pale yellow | Peeling 0 in 3 | Peeling 2 in 3 |

Figure 6

TABLE 2

|  | Ratio of total light flux after the accelerated deterioration test for 500 hours to total light flux before accelerated deterioration test |
|---|---|
| Example 7 Composition E | 81% |
| Example 8 Composition F | 72% |
| Comparative Example 9 Composition G | 69% |

Figure 7

ENCAPSULATION RESINS

FIELD OF THE INVENTION

The present invention relates to encapsulating materials preferably used in the fields of semiconductor luminescent devices and aerospace. More specifically, the invention relates to curable polyorganosiloxanes that cure in the absence of a hydrosilylation catalyst, and which when cured show excellent heat resistance and UV resistance performance.

BACKGROUND OF THE INVENTION

High brightness light emitting diodes (HBLEDs) offer enhanced energy efficiency thus making them suitable for specialty lighting applications. An LED device is usually composed of the LED chip fabricated onto a substrate and then encapsulated by a material acting as a lens. The following are the operational requirements of a material to be utilized as an encapsulant of LEDs: optical clarity, high temperature resistant, UV resistant, high refractive index and variable mechanical properties (preferably soft to hard materials).

Encapsulant materials must be optically transparent (greater than 90% transmittance) and should be able to withstand high temperatures, for extended periods of time, without degradation in mechanical and optical performance. The LED device encounters high temperature conditions during the device fabrication (soldering up to 260° C.) and during the actual device operation (around 150° C. for thousands of hours).

Epoxy resins have conventionally been used as a transparent resin for the encapsulation (1, 2). Also, PMMA (polymethylmethacrylate-PMMA), polycarbonate, and optical nylon have been used. However, optical properties of such conventional resins degrade over time. Coloration, or "yellowing", occurs either by heat induced degradation (heat resistance) or via prolonged irradiation with short wavelength light (ultraviolet-resistance). This results in water entering from the encapsulated portion to disturb performance of LED, and the resin discolors by ultraviolet light emitted from LED to decrease light transmittance of the transparently encapsulated portion. Mechanical degradation of the encapsulant also results in cracking, shrinking or delamination from the substrate. Thus, it is desirable to have an encapsulant system that allows variation of mechanical properties, from soft elastomers to hard plastics. The encapsulant must be hard enough to serve as mechanical support for the LED component, and at the same time must be soft or flexible enough to relieve internal stress during the device fabrication (prevent damage to LED chip or wires) and during temperature cycling (expansion and contraction of materials with different thermal expansion coefficients).

To overcome the above problems, a fluorine-containing cured product in transparent encapsulation of an emission element has been proposed (3). Although, this fluorine-containing cured product has excellent colorless transparency, light resistance and heat resistance as compared with the epoxy resin, but has the problem that adhesion to a material to be encapsulated is poor, and it is liable to peel from the material to be encapsulated. Furthermore, a material of LED chip, specifically a material of an emission layer of LED chip, has high refractive index, specifically refractive index of light in a visible light region, of from 2.5 to 3.0, but the fluorine-containing cured product has low refractive index of light in the same wavelength region. Therefore, the pick-up efficiency of light in the same wavelength region has not always been sufficient in the fluorine-containing cured product.

To solve the above problems, LED encapsulated with a glass prepared with a sol-gel method were proposed (4). This LED makes it possible to reduce hygroscopicity through an encapsulating material and decrease in light transmission due to discoloration of an encapsulating material, and additionally improve heat resistance. However, in the sol-gel glass, fine pores are liable to remain and cracks are easily generated. Therefore, there was the problem that when water enters the fine pores or crack sites, the water disturbs performance of LED. Furthermore, a glass is generally poor in adhesion between a substrate and a wiring metal as compared with a resin. Therefore, there was the problem that water enters from the interface between an encapsulating glass and the substrate or the wiring metal.

It has also been proposed that a low melting glass is heat melted, and LED is transparently encapsulated with the melt (5). However, where a low melting glass is generally heat melted, it is necessary to heat the glass to a temperature of from 400 to 700° C. Therefore, a phosphor used in LED may undergo heat deterioration.

To those problems, a silicone resin (polyorganosiloxane) having excellent heat resistance and ultraviolet resistance is used as a substitute of the epoxy resin. However, silicone resins up to now tend to scar easily, and are not yet sufficient in adhesion, colorless transparency, heat resistance, resistance to moist heat and UV resistance (5, 6, 7, 8, 9).

With the recent development of GaN-based devices which emit short wavelength radiation such as blue light or ultraviolet light, and subsequently white light by combining these light emitting diodes with a fluorescent phosphor, the material requirements for the encapsulant has significantly increased. Materials should be able to withstand exposure to radiation of high intensity without degradation in optical and mechanical properties.

Therefore, there is a need for robust LED encapsulants with superior optical clarity, high temperature-resistance, UV-resistance, high refractive index, and with variable elastic properties (preferably soft to hard materials). The present invention allows such properties to be achieved. There is also a need for LED encapsulants with varying mechanical properties, without sacrificing their optical clarity, high temperature-resistance and UV-resistance. The present invention allows such properties to be achieved.

SUMMARY OF THE INVENTION

The present invention provides curable polyorganosiloxane that can be used in encapsulation at a temperature far lower than 300° C., has excellent light transmission properties (colorless transparency) in a wavelength region of from ultraviolet light to visible light, light resistance, heat resistance, resistance to moist heat and UV resistance, and does not generate cracks and peeling even in use over a long period of time. In this respect, the term "colorless transparency" means to transmit light having a wavelength region (350 to 800 nm) of from near ultraviolet light to visible light, and means that light transmittance of a cured film (thickness: at least 100 um) in such a wavelength region is preferably 80% or more, and more preferably 90% or more.

The invention also provides for encapsulating materials using the curable polyorganosiloxane, and materials for the aerospace industry utilizing the excellent properties of the disclosed curable polyorganosiloxane in order to overcome the above-described problems in the prior art.

The polyorganosiloxanes of the invention may be used alone, or may be used as a composite with other material. For example, as a material for aerospace industry, the polyorganosiloxane is combined with a carbon-based nanomaterial to form a composite, and such a composite can be used as a material for removing static electricity, a conductive adhesive, a gasket material, a flash defensive material, an electromagnetic shielding material, a tank material, a rocket outer material and the like.

The invention provides for curable polyorganosiloxanes comprising a compound represented by the following formula in an amount of 50% by weight or more, characterized in that said polyorganosiloxane cures, substantially in the absence of a hydrosilylation catalyst:

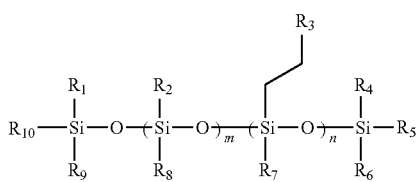

wherein $R_1$ to $R_{10}$ each independently represent a group selected from hydride, alkyl, alkenyl, aryl and non-condensable silyl group, and m and n each are an integer of 0 or more.

In another embodiment, curing of such curable polyorganosiloxanes can occur by heating at a temperature of 80° C. or higher for an overall heating temperature of 1 hour or more. Alternatively, such curable polyorganosiloxanes can be cured by methods known to those of skill in the art such as, but not limited to, using UV radiation.

In another embodiment, a method is provided for producing a curable polyorganosiloxane, by reacting a vinyl-containing compound (A) and a hydrosilyl-containing compound (B), where said compounds A and B are represented by the following general formulae:

(A)

wherein $R_{11}$ is a group selected from alkyl, aryl and non-condensable silyl group;

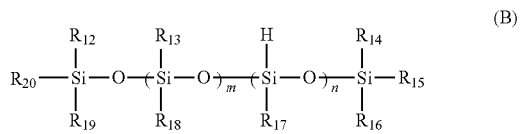
(B)

wherein $R_{12}$ to $R_{20}$ each independently represent a group selected from hydride, alkyl, alkenyl, aryl and non-condensable silyl group, and m and n each are an integer of 0 or more.

In yet another embodiment, the aforementioned vinyl-containing compound (A) and/or the hydrosilyl-containing compound (B) have a weight average molecular weight of 3,000 or more obtained by measuring with GPC (gel permeation chromatography) using a polystyrene standard material in calibration curve measurement.

In a preferred embodiment of the invention, the curable polyorganosiloxanes are obtained using a noble metal oxide as a catalyst.

In yet another embodiment, silicone members are provided by curing the curable compositions of the above invention. The silicone members disclosed can be used in semiconductor luminescent devices or in devices used within the aerospace industry.

In one embodiment, a curable composition comprised of the curable polyorganosiloxanes may contain solvents, adhesion promoters (e.g. epoxy containing material), and/or filler-like materials (e.g. silica-gel or nano sized carbon) known to those of skill in the art.

As a result of extensive and intensive investigations, it has been found that according to a specific method for producing a curable polyorganosiloxane, a polyorganosiloxane capable of satisfying the above objects can be obtained. Additionally, the use of solid metal noble catalysts in the present invention means that, because they can easily removed from the reaction products, substantially less catalyst residue is present in the curable polyorganosiloxane compared to when using conventional methods that rely on fixed supported catalyst. As a result, undesirable side-reactions, originating from the presence of such catalyst residue, are reduced. This contributes to markedly improve storage stability of a polyorganosiloxane product.

It has been further found that a noble metal oxide catalyst separately recovered can be reused, which is a preferred system industrially and economically.

The invention also allows for the mechanical properties of the elastomeric resins to be varied and/or tuned to the desired stiffness, toughness and flexibility that best suit the specific application. The system offers a range of material platforms that fulfill all of the requirements and function as advanced encapsulating materials for both LED devices, as well as other emerging applications.

The polyorganosiloxanes of the invention are suitable for use not only in the LED field, but as materials for the aerospace industry that requires various properties such as light transmission properties (colorless transparency), light resistance, heat resistance, resistance to moist heat and UV resistance, and other materials.

BRIEF DESCRIPTION OF THE DRAWINGS

For a more complete understanding of the present invention, reference is now made to the following descriptions taken in conjunction with the accompanying figures, in which:

FIG. 6 shows a table disclosing the properties of resins made with non-condensable reactants compared to those made with condensable reactants.

FIG. 7 shows a table disclosing the properties of phosphor pastes made from curable compositions of the invention compared to those the prior art.

DETAILED DESCRIPTION OF THE INVENTION

Figure 1:
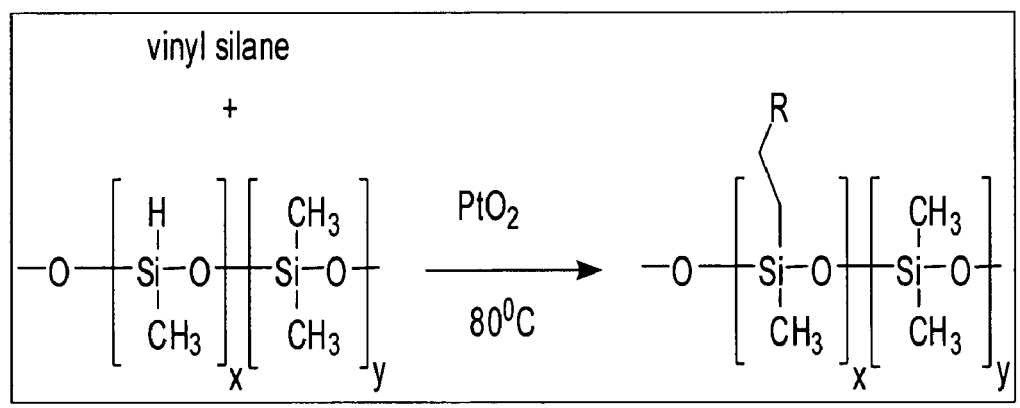
FIG. 1 shows a flow chart that represents the general procedure for the preparation of the functionalized PDMS-based encapsulants with high molecular weight vinyl silane.

The invention relates silicone resins that can be cured by heat in the absence of a hydrosilylation catalyst. Silicone resins produced by the above method have excellent adhesion, transparency, resistance to moist heat and UV resistance, and are therefore useful in various applications such as an encapsulation resin of LED, a phosphor paste and an aerospace material.

Novel curable polyorganosiloxanes are provided having the general formula of:

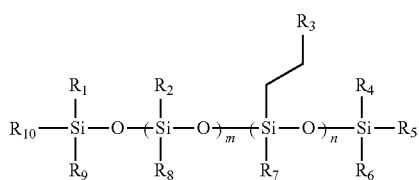

where $R_1$ to $R_{10}$ each independently represent a group selected from hydride, alkyl, alkenyl, aryl, and non-condensable silyl group, and m and n each are an integer of 0 or more.

Preferred specific examples of the above general formula in the specification are as follows:

The alkyl, alkenyl, aryl, and non-condensable silyl group may be substituted with a halogen atom. Examples of the preferred alkyl include methyl, ethyl, propyl and trifluoropropyl. An example of the preferred alkenyl includes vinyl. An example of the preferred aryl includes phenyl. An example of a preferred non-condensable group include trimethylsilyl, triethylsilyl and triphenylsilyl groups.

Curable polyorganosiloxanes are provided by reacting a vinyl-containing compound A, represented by the following general formula, and a hydrosilyl-containing compound B, represented by the general formula:

(A)

wherein $R_{11}$ is a group selected from alkyl, aryl and non-condensable silyl group;

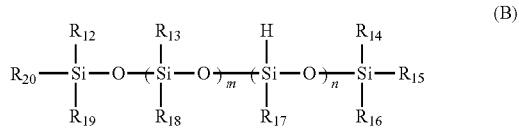

(B)

where $R_{12}$ to $R_{20}$ each independently represent a group selected from hydride, alkyl, alkenyl, aryl and non-condensable silyl group, and m and n each are an integer of 0 or more.

The above vinyl-containing compound A preferably contains a compound having 4 or less, preferably 3 or less and more preferably 2 or less vinyl groups in one molecule in a proportion of 50 mol % or more from the standpoint of cost and general-purpose properties. From the standpoint of increasing the degree of crosslinking and improving physical strength of a cured product, a compound having a structure that siloxane high molecular chains are extended to at least three directions with a center on its optional silicon atom is also preferred. Specifically, compounds generally called T-type silicone resin by one skilled in the art of this field can be illustrated. Furthermore, commercially available products can be used as the vinyl-containing compound. Specific examples of the vinyl-containing compound include DMS Series, PDV Series, FMV Series, VDT Series, VMS Series, VTT Series and MTV Series, products of Gelest, Inc.: ME-91, a product of Momentive Performance Materials; and dimethyldivinylsilane, diethylmethylvinylsilane, dimethylphenylvinylsilane, divinylmethylphenylsilane, methyltrivinylsilane, phenyltrivinylsilane, trimethylvinylsilane and triphenylvinylsilane that are vinyl-containing silane coupling agents.

The hydrosilyl-containing compound B can be those commercially available. Specific examples of these include HMS Series, DMS Series, HES Series, HDP Series, HPM Series and HAM Series, products of Gelest, Inc.; and KF-99 and KF-9901, products of Shin-Etsu Chemical Co., Ltd.

In a preferred embodiment, neither the vinyl-containing compound A nor the hydrosilyl-containing compound B contain condensable functional groups.

In another preferred embodiment of the invention, the curable polyorganosiloxanes are obtained using a noble metal oxide as a catalyst. Specific examples of the noble metal oxide are oxides of Pt, Rh, Ru, Ir, Pd and Fe. For, for example, hydrosilylation reaction, $PdO_2$ is more preferable because of its higher catalytic activity. These oxides can be used in solid granular form, and can be removed from the reaction by processes known to those of skill in the art, such as filtration and centrifugation. Alternatively, such catalysts can be present as a fixed bed catalyst. Either way, the result is that such a hydrosilylation catalyst is not part of the curable polyorganosiloxane composition, and accordingly such a catalyst is not part of the final cured product, as evident using more traditional processes.

The present invention relates to a thermally curable polyorganosiloxanes prepared via hydrosilation reaction of a methylhydrido-polydimethylsiloxane (providing SiH along the polymer backbone) and high molecular weight vinyl polysiloxane (providing reactive C=C bonds) in the presence of a platinum catalyst. Thermal curing of the elastomeric resin results in an optically clear, thermally stable and mechanically robust elastomeric matrix. The performance and thermal durability of these encapsulant materials is significantly improved when compared to other commercial silicone resins thus making the system suitable for LED encapsulant application as well as for aerospace industry.

FIG. 1 represents the general procedure for the preparation of these silicone-based encapsulant resins which involves the functionalization/modification of a methylhydrido-polydimethylsiloxane (H-PDMS). High molecular weight vinyl silanes are incorporated along the polysiloxane backbone by hydrosilylation using a solid $PtO_2$ catalyst. The solid catalyst is removed simply by centrifugation or filtration. This catalyst-free, PDMS-based liquid resin is unique and different from other conventional PDMS-based resins. See for example U.S. Pat. No. 7,160,972 B2 that discloses a polysiloxane-based resin typically employing hydrosilylation cure chemistry. Such resin type requires 2-part systems, where part A contains the platinum catalyst together with vinylsiloxane copolymer and part B is the hydrodisiloxane copolymer.

A critical advantage of this approach is the versatility in the structure and functionality of various vinyl silanes that are and can be incorporated along the PDMS backbone. This multifunctional system is less susceptible to inhibition than chain-end functionalized systems. This enables a library of resins to be prepared with controllable degrees of crosslinking, and thus offers a wide variety of physical properties. This process is also highly efficient and requires very low monomer concentrations to create the desired change in the molecular structure and mechanical properties without the need for complicated multicomponent systems. The key point is simplicity and functionality. A catalyst-free system eliminates problems that may arise due to unwanted side reactions between the components of an LED package (i.e. LED chip, phosphors, packaging cup, etc.). In addition, the one-pot nature of the formulation makes the system even more attractive.

Figure 2:
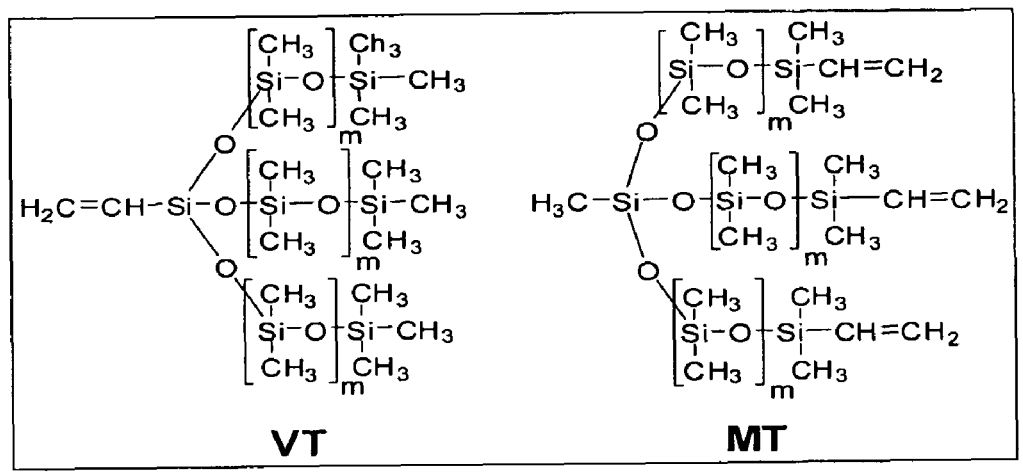
FIG. 2 gives the molecular structures of the different high MW vinyl silanes used.

FIG. 2 illustrates the molecular structures of the various high molecular weight vinyl silanes investigated in this study. Results have shown that the use of these high molecular weight vinyl silanes did not affect their optical transparency and thermal stability but rather significantly improved and/or modified the stiffness, toughness and flexibility of the resin.

Uses of the Semiconductor Light-Emitting Device Members Made with the Polyorganosiloxanes of the Invention The semiconductor light-emitting device member in the present invention is not particularly limited in its use and can be used for various purposes including as a member (sealing compound) for sealing a semiconductor light-emitting device and the like. Among others, by combining with phosphor particles and/or inorganic oxide particles, the semiconductor light-emitting device member in the present invention can suitably be used for specific purposes. The combined use with phosphor particles is described below.

Combined Use with Phosphor Particles

The semiconductor light-emitting device member in the present invention can be used, for example, as a wavelength conversion member by dispersing a phosphor in the semiconductor light-emitting device member for molding inside a semiconductor light-emitting device cup or coating as a thin film on an appropriate transparent support. One phosphor may be used alone or two or more types of phosphors may be used in an arbitrary combination and ratio for example to make the light-emitting device, 'White LED'.

Phosphor

Composition of the phosphor is not particularly limited, but it is preferable to combine a crystalline matrix, for example, metallic oxide such as $Y_2O_3$ and $Zn_2SiO_4$, phosphate such as $Ca_5(PO_4)_3Cl$, or sulfide such as ZnS, SrS, and CaS with ions of rare earth metal such as Ce, Pr, Nd, Pm, Sm, Eu, Tb, Dy, Ho, Er, Tm, and Yb or ions of metal such as Ag, Cu, Au, Al, Mn, and Sb as an activator or coactivator.

Preferable examples of the crystalline matrix include sulfide such as (Zn, Cd)S, $SrGa_2S_4$, SrS, and ZnS, oxysulfide such as $Y_2O_2S$, aluminate such as $(Y, Gd)_3Al_5O_{12}$, $YAlO_3$, $BaMgAl_{10}O_{17}$, (Ba, Sr)(Mg, Mn)$Al_{10}O_{17}$, (Ba, Sr, Ca)(Mg, Zn, Mn)$Al_{10}O_{17}$, $BaAl_{12}O_{19}$, $CeMgAl_{11}O_{19}$, (Ba, Sr, Mg)O.$Al_2O_3$, $BaAl_2Si_2O_8$, $SrAl_2O_4$, $Sr_4Al_{14}O_{25}$, and $Y_3Al_5O_{12}$, silicate such as $Y_2SiO_5$ and $Zn_2SiO_4$, oxide such as $SnO_2$ and $Y_2O_3$, borate such as $GdMgB_5O_{10}$, (Y, Gd)$BO_3$, halophosphate such as $Ca_{10}(PO_4)_6(F, Cl)_2$ and (Sr, Ca, Ba, Mg)$_{10}(PO_4)_6Cl_2$ and phosphate such as $Sr_2P_2O_7$ and (La, Ce)$PO_4$.

However, the above crystalline matrix and the activator or coactivator are not particularly limited in elemental composition and can partially be substituted by analogous elements, and a resultant phosphor can be used if it absorbs light in the near-ultraviolet to visible region and emits visible light.

More specifically, substances shown below can be used as a phosphor, but these are only exemplary substances and phosphors that can be used in the present invention are not limited to these. In the exemplification shown below, phosphors whose structure is different only partially are shown in an abbreviated manner when appropriate. For example, "$Y_2SiO_5:Ce^{3+}$", "$Y_2SiO_5:Tb^{3+}$", and "$Y_2SiO_5:Ce^{3+}, Tb^{3+}$" are shown in a unifying manner as "$Y_2SiO_5:Ce^{3+}, Tb^{3+}$", and "$La_2O_2S:Eu$", "$Y_2O_2S:Eu$" and "$(La, Y)_2O_2S:Eu$" are shown in a unifying manner as "$(La, Y)_2O_2S:Eu$". An abbreviated location is delimited by a comma (,).

Red Phosphor

The range of concrete wavelengths of fluorescence emitted by a phosphor that emits red fluorescence (hereinafter referred to as a "red phosphor" when appropriate) is exemplified as usually 570 nm or more, preferably 580 nm or more, and usually 700 nm or less, preferably 680 nm or less.

Such red phosphors include a europium activation alkaline earth silicon nitride phosphor represented by (Mg, Ca, Sr, Ba)$_2Si_5N_8$:Eu and configured by fracture particles having a red fracture surface to emit light in the red region and europium activation rare earth oxychalcogenide phosphor represented by (Y, La, Gd, Lu)$_2O_2S$:Eu and configured by grown particles having approximately a spherical shape as a regular crystal growth shape to emit light in the red region.

Further, a phosphor containing oxynitride and/or oxysulfide containing at least one element selected from a group consisting of Ti, Zr, Hf, Nb, Ta, W, and Mo disclosed by Japanese Patent Application Laid-Open No. 2004-300247 and containing an α-sialon structure in which part or all of Al elements are substituted by the Ga elements can also be used in the present embodiment. Such a phosphor is a phosphor containing oxynitride and/or oxysulfide.

As other red phosphors, an Eu activation oxysulfide phosphor such as (La, Y)$_2O_2S$:Eu, Eu activation oxide phosphor such as Y(V, P)$O_4$:Eu and $Y_2O_3$:Eu; Eu, Mn activation silicate phosphor such as (Ba, Sr, Ca, Mg)$_2SiO_4$:Eu, Mn and (Ba, Mg)$_2SiO_4$:Eu, Mn; Eu activation sulfide phosphor such as (Ca, Sr)S:Eu, Eu activation aluminate phosphor such as $YAlO_3$:Eu, Eu activation silicate phosphor such as $LiY_9(SiO_4)_6O_2$:Eu, $Ca_2Y_8(SiO_4)_6O_2$:Eu, (Sr, Ba, Ca)$_3SiO_5$:Eu, and $Sr_2BaSiO_5$:Eu, Ce activation aluminate phosphor such as (Y, Gd)$_3Al_5O_{12}$:Ce and (Tb, Gd)$_3Al_5O_{12}$:Ce, Eu activation nitride phosphor such as (Ca, Sr, Ba)$_2Si_5N_8$:Eu, (Mg, Ca, Sr, Ba)SiN$_2$:Eu, and (Mg, Ca, Sr, Ba)AlSiN$_3$:Eu, Ce activation nitride phosphor such as (Mg, Ca, Sr, Ba)AlSiN$_3$:Ce; Eu, Mn activation halophosphate phosphor such as (Sr, Ca, Ba, Mg)$_{10}(PO_4)_6Cl_2$:Eu, Mn; Eu, Mn activation silicate phosphor such as (Ba$_3$Mg)Si$_2O_8$:Eu, Mn and (Ba, Sr, Ca, Mg)$_3$(Zn, Mg)Si$_2O_8$:Eu, Mn; Mn activation germanide phosphor such as 3.5MgO.0.5MgF$_2$.GeO$_2$:Mn, Eu activation oxynitride phosphor such as Eu activation α-sialon; Eu, Bi activation oxide phosphor such as (Gd, Y, Lu, La)$_2O_3$:Eu, Bi; Eu, Bi activation oxysulfide phosphor such as (Gd, Y, Lu, La)$_2O_2S$: Eu, Bi; Eu, Bi activation vanadate phosphor such as (Gd, Y, Lu, La)VO$_4$:Eu, Bi; Eu, Ce activation sulfide phosphor such as $SrY_2S_4$:Eu, Ce; Ce activation sulfide phosphor such as CaLa$_2$S$_4$:Ce; Eu, Mn activation phosphate phosphor such as (Ba, Sr, Ca)MgP$_2$O$_7$:Eu, Mn and (Sr, Ca, Ba, Mg, Zn)$_2$P$_2$O$_7$: Eu, Mn; Eu, Mo activation tungstate phosphor such as (Y, Lu)$_2$WO$_6$:Eu, Mo; Eu, Ce activation nitride phosphor such as (Ba, Sr, Ca)$_x$Si$_y$N$_z$:Eu, Ce (x, y, and z are integers equal to 1 or greater); Eu, Mn activation halophosphate phosphor such as (Ca, Sr, Ba, Mg)$_{10}$(PO$_4$)$_6$(F, Cl, Br, OH):Eu, Mn and Ce activation silicate phosphor such as ((Y, Lu, Gd, Tb)$_{1-x}$Sc$_x$-Ce$_y$)$_2$(Ca, Mg)$_{1-r}$(Mg, Zn)$_{2+r}$Si$_{z-q}$Ge$_q$O$_{12+\delta}$ can also be used.

Also as a red phosphor, a red organic phosphor comprised of rare earth element ion complexes having anions such as β-diketonate, β-diketone, aromatic carboxylic acid, and Broensted acid as ligands, perylene pigment (for example, dibenzo{[f,f]-4,4',7,7'-tetraphenyl}diindeno[1,2,3-cd:1',2', 3'-lm]perylene), anthraquinone pigment, lake pigment, azo pigment, quinacridone pigment, anthracene pigment, isoindoline pigment, isoindolinone pigment, phthalocyanine pigment, triphenylmethane basic dye, indanthrone pigment, indophenol pigment, cyanine pigment, and dioxazine pigment can also be used.

Also, among red phosphors, those whose peak wavelength is 580 nm or more, preferably 590 nm or more, and 620 nm or less, preferably 610 nm or less can be suitably used as an orange phosphor. Examples such orange phosphors include (Sr, Ba)$_3$SiO$_5$:Eu, (Sr, Mg)$_3$(PO$_4$)$_2$:Sn$^{2+}$, and SrCaAlSiN$_3$: Eu.

Green Phosphor

The range of concrete wavelengths of fluorescence emitted by a phosphor that emits green fluorescence (hereinafter referred to as a "green phosphor" when appropriate) is exemplified as usually 490 nm or more, preferably 500 nm or more, and usually 570 nm or less, preferably 550 nm or less.

Such green phosphors include a europium activation alkaline earth silicon oxynitride phosphor represented by (Mg, Ca, Sr, Ba)Si$_2$O$_2$N$_2$:Eu and configured by fracture particles having a fracture surface to emit light in the green region and europium activation alkaline earth silicate phosphor represented by (Ba, Ca, Sr, Mg)$_2$SiO$_4$:Eu and configured by fracture particles having a fracture surface to emit light in the green region.

As other green phosphors, an Eu activation aluminate phosphor such as Sr$_4$Al$_{14}$O$_{25}$:Eu and (Ba, Sr, Ca)Al$_2$O$_4$:Eu, Eu activation silicate phosphor such as (Sr, Ba)Al$_2$Si$_2$O$_8$:Eu, (Ba, Mg)$_2$SiO$_4$:Eu, (Ba, Sr, Ca, Mg)$_2$SiO$_4$:Eu, and (Ba, Sr, Ca)$_2$(Mg, Zn)Si$_2$O$_7$:Eu; Ce, Tb activation silicate phosphor such as Y$_2$SiO$_5$:Ce, Tb, Eu activation boric acid phosphate phosphor such as Sr$_2$P$_2$O$_7$—Sr$_2$B$_2$O$_5$:Eu, Eu activation halosilicate phosphor such as Sr$_2$Si$_3$O$_8$-2SrCl$_2$:Eu, Mn activation silicate phosphor such as Zn$_2$SiO$_4$:Mn, Tb activation aluminate phosphor such as CeMgAl$_{11}$O$_{19}$:Tb and Y$_3$Al$_5$O$_{12}$:Tb, Tb activation silicate phosphor such as Ca$_2$Y$_8$(SiO$_4$)$_6$O$_2$:Tb and La$_3$Ga$_5$SiO$_{14}$:Tb; Eu, Tb, Sm activation thiogallate phosphor such as (Sr, Ba, Ca)Ga$_2$S$_4$:Eu, Tb, Sm; Ce activation aluminate phosphor such as Y$_3$(Al, Ga)$_5$O$_{12}$:Ce and (Y, Ga, Tb, La, Sm, Pr, Lu)$_3$(Al, Ga)$_5$O$_{12}$:Ce, Ce activation silicate phosphor such as Ca$_3$Sc$_2$Si$_3$O$_{12}$:Ce and Ca$_3$(Sc, Mg, Na, Li)$_2$Si$_3$O$_{12}$:Ce, Ce activation oxide phosphor such as CaSc$_2$O$_4$:Ce, Eu activation oxynitride phosphor such as SrSi$_2$O$_2$N$_2$:Eu, (Sr, Ba, Ca)Si$_2$O$_2$N$_2$:Eu, and Eu activation β-sialon and Eu activation α-sialon; Eu, Mn activation aluminate phosphor such as BaMgAl$_{10}$O$_{17}$:Eu, Mn; Eu activation aluminate phosphor such as SrAl$_2$O$_4$:Eu, Tb activation oxysulfide phosphor such as (La, Gd, Y)$_2$O$_2$S:Tb; Ce, Tb activation phosphate phosphor such as LaPO$_4$:Ce, Tb; sulfide phosphor such as ZnS:Cu, Al and ZnS:Cu, Au, Al; Ce, Tb activation borate phosphor such as (Y, Ga, Lu, Sc, La)BO$_3$: Ce, Tb; Na$_2$Gd$_2$B$_2$O$_7$:Ce, Tb; and (Ba, Sr)$_2$(Ca, Mg, Zn)B$_2$O$_6$:K, Ce, Tb; Eu, Mn activation halosilicate phosphor such as Ca$_8$Mg(SiO$_4$)$_4$Cl$_2$:Eu, Mn; Eu activation thioaluminate phosphor and thiogallate phosphor such as (Sr, Ca, Ba) (Al, Ga, In)$_2$S$_4$:Eu, and Eu, Mn activation halosilicate phosphor such as (Ca, Sr)$_8$(Mg, Zn)(SiO$_4$)$_4$Cl$_2$:Eu, Mn can also be used.

Also, organic phosphors such as a pyridine-phthalimide condensation derivative, fluorescent dyes such as benzooxazinone, quinazolinone, coumarin, quinophthalone, and naphthalate imide, and terbium complex having hexylsalicylate as a ligand can be used as a green phosphor.

Blue Phosphor

The range of concrete wavelengths of fluorescence emitted by a phosphor that emits blue fluorescence (hereinafter referred to as a "blue phosphor" when appropriate) is exemplified as usually 420 nm or more, preferably 440 nm or more, and usually 480 nm or less, preferably 470 nm or less.

Such blue phosphors include a europium activation barium-magnesium aluminate phosphor represented by BaMgAl$_{10}$O$_{17}$:Eu and configured by grown particles having approximately a hexagonal shape as a regular crystal growth shape to emit light in the blue region, europium activation calcium halophosphate phosphor represented by (Ca, Sr, Ba)$_5$(PO$_4$)$_3$Cl:Eu and configured by grown particles having approximately a spherical shape as a regular crystal growth shape to emit light in the blue region, europium activation alkaline earth chloroborate phosphor represented by (Ca, Sr, Ba)$_2$B$_5$O$_9$Cl:Eu and configured by grown particles having approximately a cubic shape as a regular crystal growth shape to emit light in the blue region, and europium activation alkaline earth aluminate phosphor represented by (Sr, Ca, Ba)Al$_2$O$_4$:Eu or (Sr, Ca, Ba)$_4$Al$_{14}$O$_{25}$:Eu and configured by fracture particles having a fracture shape to emit light in the blue region.

As other blue phosphors, an Sn activation phosphate phosphor such as Sr$_2$P$_2$O$_7$:Sn, Eu activation aluminate phosphor such as Sr$_4$Al$_{14}$O$_{25}$:Eu, BaMgAl$_{10}$O$_{17}$:Eu, and BaAl$_8$O$_{13}$: Eu, Ce activation thiogallate phosphor such as SrGa$_2$S$_4$:Ce and CaGa$_2$S$_4$:Ce, Eu activation aluminate phosphor such as (Ba, Sr, Ca)MgAl$_{10}$O$_{17}$:Eu and BaMgAl$_{10}$O$_{17}$:Eu, Tb, Sm; Eu, Mn activation aluminate phosphor such as (Ba, Sr, Ca)MgAl$_{10}$O$_{17}$:Eu, Mn; Eu activation halophosphate phosphor such as (Sr, Ca, Ba, Mg)$_{10}$(PO$_4$)$_6$Cl$_2$:Eu and (Ba, Sr, Ca)$_5$(PO$_4$)$_3$(Cl, F, Br, OH):Eu, Mn, Sb; Eu activation silicate phosphor such as BaAl$_2$Si$_2$O$_8$:Eu and (Sr, Ba)$_3$MgSi$_2$O$_8$:Eu, Eu activation phosphate phosphor such as Sr$_2$P$_2$O$_7$:Eu, sulfide phosphor such as ZnS:Ag and ZnS:Ag, Al; Ce activation silicate phosphor such as Y$_2$SiO$_5$:Ce, tungstate phosphor such as CaWO$_4$, Eu, Mn activation boric acid phosphate phosphor such as (Ba, Sr, Ca)BPO$_5$:Eu, Mn, (Sr, Ca)$_{10}$(PO$_4$)$_6$.nB$_2$O$_3$:Eu, and 2SrO.0.84P$_2$O$_5$.0.16B$_2$O$_3$:Eu, and Eu activation halosilicate phosphor such as Sr$_2$Si$_3$O$_8$.2SrCl$_2$:Eu can also be used.

Also, organic phosphors such as a fluorescent dye of naphthalate imide, benzooxazole, styryl, coumarin, pilarizon, and triazole compounds and thulium complex can be used as a blue phosphor.

One phosphor may be used alone or two or more types of phosphors may be used in an arbitrary combination and ratio.

A media particle diameter of these phosphor particles is not particularly limited, but is usually 100 nm or more, preferably 2 μm or more, and still preferably 5 μm or more, and usually 100 μm or less, preferably 50 μm or less, and still preferably 20 μm or less. Also, the shape of phosphor particles is not particularly limited as long as formation of semiconductor light-emitting device members is not affected, for example, fluidity of a phosphor part formation liquid (liquid obtained by adding a phosphor to this invention's semiconductor light-emitting device member formation liquid) is not affected.

In the present invention, the method of adding phosphor particles is not particularly limited. If phosphor particles are in a good dispersion state, it is sufficient only to post-mix phosphor particles into the semiconductor light-emitting device member formation liquid. If phosphor particles tend to aggregate, they can be mixed in advance into the raw materials before hydrosilylation.

The present invention is described further specifically by the Examples, but it should be understood that the invention is not limited to the following Examples so far as the invention is not beyond its gist.

EXAMPLE 1

Functionalization of Polydimethylsiloxane (PDMS) with High Molecular Weight Vinyl Silane (MT)

(a) with toluene: In a vial, charged with a stir bar, 1 g (20 wt. %) of toluene was mixed with 3 g (58 wt. %) of H-PDMS (5-7% H, 65000 MW), 1.2 g (22 wt. %) of MTV-112 (Gelest) vinyl silane and 1 mg (<200 ppm) of $PtO_2$ (average diameter of particle is 20 μm: the smallest particle size is approximately 0.5 μm in diameter and the largest particle size is approximately 50 μm in diameter) catalyst. The mixture was allowed to react for 3 hours at 80° C. using an oil bath. The liquid resin was then centrifuged for 10 minutes at 2000 rpm and decanted to remove the solid catalyst. Toluene was removed by vacuum. The resin was then poured onto tared Teflon discs and cured at 150° C. for no less than 6 hours.

(b) no toluene: In a vial, charged with a stir bar, 3 g (72 wt. %) of H-PDMS (5-7% H, 65000 MW) was mixed with 1.2 g (28 wt. %) of MTV-112 (Gelest) vinyl silane and 1 mg (<200 ppm) of $PtO_2$ (Average diameter; 20 μm (the smallest particle; ca. 0.5 μm diameter and the largest particle; ca. 50 μm diameter)) catalyst. The mixture was allowed to react for 2 hours at 80° C. using an oil bath. The liquid resin was then centrifuged for 10 minutes at 2000 rpm and decanted to remove the solid catalyst. The resin was then poured onto tared Teflon discs and cured at 150° C. for no less than 6 hours.

The following are the properties of the formulation:

| Cure Processing Characteristics | PDMS + MT + toluene | PDMS + MT (no toluene) |
|---|---|---|
| Shelf life at ambient temperature | 1 month | 1 month |
| Cure time at 150° C. | 6 hours | 6 hours |
| Cured Properties | Compatible with phosphors | Compatible with phosphors |
| Optical transparency at 400 nm | 93% T | 93% T |
| Thermal stability | 200° C. for 1 week | 200° C. for 1 week |
| Elastic modulus, MPa | 0.40 | 1.25 |
| Ultimate Stress, MPa | 0.56 | 0.35 |
| Elongation at break | 106% | 30% |

Figure 3:
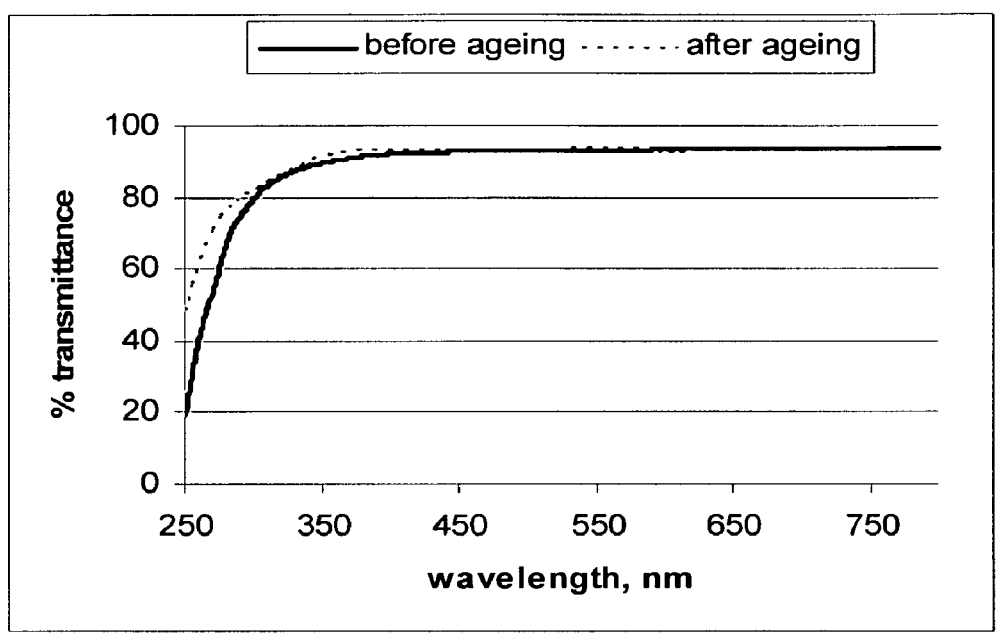
FIG. 3 shows a graph that compares the optical transmission before and after thermal ageing at 200° C. for 1 week of the formulation containing a high MW vinyl silane (MT) given in Example 1 of this invention.

FIG. 3 shows optical transmittance of greater than 90% throughout the 350 to 800 nm range for the formulation containing a high molecular weight silane (MT) along the polysiloxane backbone (obtained from Example 1). Thermal stability of the cured resins was determined by ageing the cured discs in a 200° C. oven for up to 7 days. Weight loss was observed to be less than 5% indicating minimal shrinkage and out-gassing of volatiles, thus no thermal degradation is occurring. There was no observed yellowing and the optical transmittance was still greater than 90% indicating good thermal durability and retention of good optical transparency. The material is also stable up to 300 nm, which also indicates resistance to UV. These properties make these materials highly suitable for encapsulation of LED devices.

Figure 4:
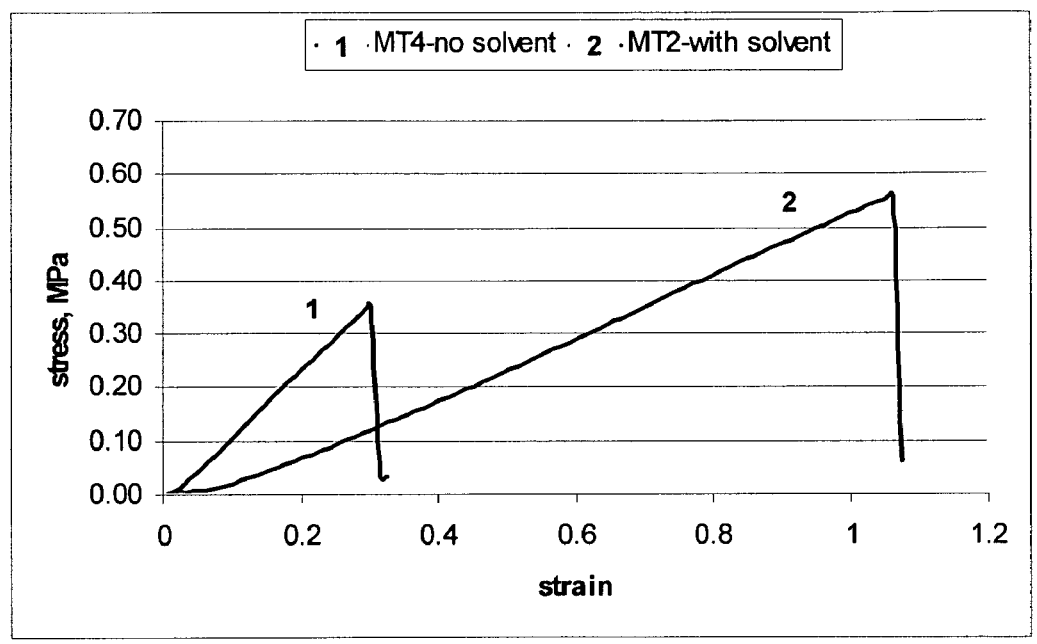
FIG. 4 shows stress-strain isotherms of the formulations using MT vinyl silane, prepared with and without solvent, as given in Example 1 of this invention.

FIG. 4 gives the isothermal stress-strain curves of the formulation containing a high molecular weight silane (MT) prepared with a solvent and the same formulation prepared without a solvent as given in Example 1 of this invention. The use of a small amount of solvent (20 wt. %) resulted to a softer (0.40 MPa modulus) and more flexible resin (106% elongation) while the formulation prepared without toluene was harder (1.25 MPa modulus) and more brittle (30% elongation).

EXAMPLE 2

Functionalization of Polydimethylsiloxane (PDMS) with High Molecular Weight Vinyl Silane (VT)

In a vial, charged with a stir bar, 3 g (72 wt. %) of H-PDMS (5-7% H, 65000 MW) was mixed with 1.2 g (28 wt. %) of VTT-106 (Gelest) and 1 mg (<200 ppm) of $PtO_2$ (average diameter of particle is 20 μm: the smallest particle size is approximately 0.5 μm in diameter and the largest particle size is approximately 50 μm in diameter) catalyst. The mixture was allowed to react for 7 hours at 80° C. using an oil bath. The liquid resin was then centrifuged for 10 minutes at 2000 rpm and decanted to remove the solid catalyst. The resins were mixed until it became completely homogeneous then poured onto tared Teflon discs and cured at 150° C. for no less than 6 hours.

| Cure Processing Characteristics | PDMS + VTT |
|---|---|
| Shelf life at ambient temperature | 2 month |
| Cure time at 150° C. | 6 hours |
| Cured Properties | Compatible with phosphors |
| Optical transparency at 400 nm | 93% T |
| Thermal stability | 200° C. for 1 week |
| Elastic modulus, MPa | 0.10 |
| Ultimate Stress, MPa | 0.68 |
| Elongation at break | 323% |

Figure 5:
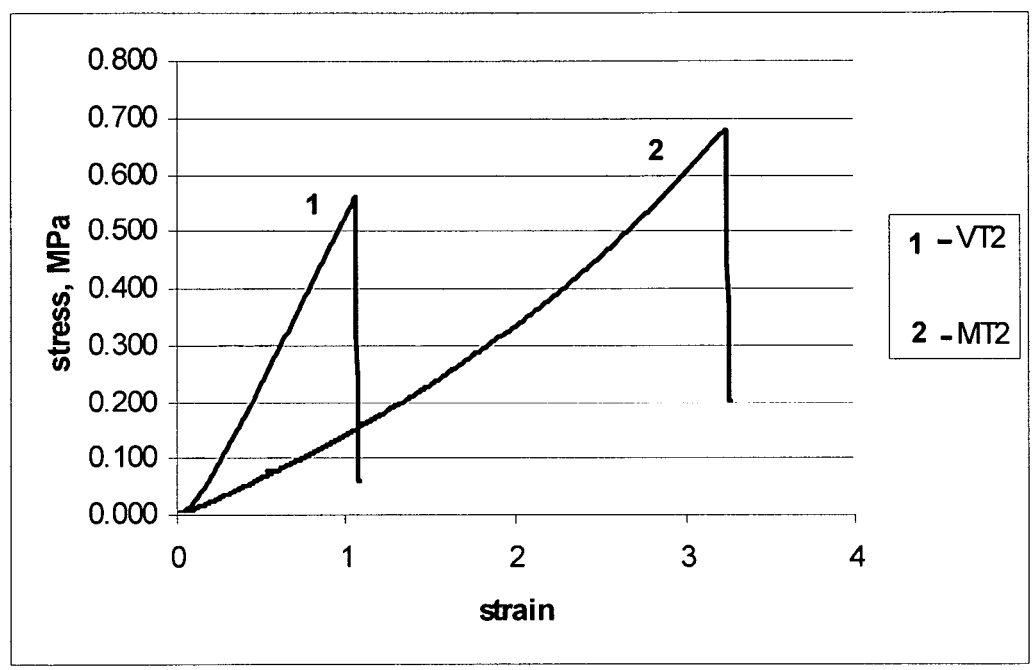
FIG. 5 shows stress-strain isotherms of the formulation containing high MW vinyl silanes given in Example 1 and Example 2 of this invention.

FIG. 5 compares the elastic properties of the formulation containing high molecular weight silanes given in Example 1 and Example 2 of this invention. Each silane had a different effect on the mechanical properties of the resin. The formulation containing VT silane produced quite soft (0.10 MPa modulus) and elastic (323% elongation) resin. The mechanical properties can be tuned simply by choosing the corresponding high molecular weight silane.

Results also demonstrated the compatibility of the silicone encapsulant resin with various inorganic phosphors. Depending on the viscosity and/or thixotropy of the resin, fillers/modifiers can be added to the resin.

The developed approach allows for the mechanical properties of the elastomeric resins to be varied and/or tuned to the desired stiffness, toughness and flexibility that best suit the specific application. The system offers a range of material platforms that fulfill all of the requirements and function as advanced encapsulating materials for both LED devices, as well as other emerging applications.

EXAMPLE 3

A stirring bar was placed in a round-bottom flask, and 3 g of H-PDMS (5-7% H, 65000 MW), 1.2 g of VTT-106 (Gelest) and 1 mg of $PtO_2$ (average diameter of particle is 20% m: the smallest particle size is approximately 0.5 μm in diameter and the largest particle size is approximately 50 μm in diameter) catalyst were added to the flask. The reaction was conducted at 80° C. for 12 hours with stirring. The platinum oxide catalyst was removed by centrifugal separation at 2,000 rpm for 10 minutes yielding a curable polyorganosiloxane A of the invention.

When Pt residual amount in the curable polyorganosiloxane A was measured with ICP emission spectral analysis, it was found to be less than 2 ppm (less than detection limit).

EXAMPLE 4

A stirring bar was placed in a round-bottom flask, and 1.0 g of toluene, 3 g of H-PDMS (5-7% H, 65000 MW), 1.2 g of MTV-112 (methyltri(vinyl-terminated polydimethylsiloxyl) silane (Gelest) and 1 mg of $PtO_2$ (average diameter of particle is 20 μm: the smallest particle size is approximately 0.5 μm in diameter and the largest particle size is approximately 50 μm in diameter) catalyst were added to the flask. The reaction was conducted at 80° C. for 3 hours with stirring. The platinum oxide catalyst was removed by centrifugal separation at 2,000 rpm for 10 minutes, and toluene was then removed under reduced pressure yielding a curable polyorganosiloxane B of the invention.

When Pt residual amount in the curable polyorganosiloxane B was measured with ICP emission spectral analysis, it was found to be less than 2 ppm (less than detection limit).

EXAMPLE 5

A stirring bar was placed in a round-bottom flask, and 2.0 g of toluene, 8 g of H-PDMS (7-8% H, 80000 MW), 0.46 g of diethoxymethylvinylsilane, 0.55 g of triethoxyvinylsilane and 1 mg of $PtO_2$ (average diameter of particle is 20 μm: the smallest particle size is approximately 0.5 μm in diameter and the largest particle size is approximately 50 μm in diameter) catalyst were added to the flask. Reaction was conducted at 80° C. for 12 hours with stirring. The platinum oxide catalyst was removed by centrifugal separation at 2,000 rpm for 10 minutes, and toluene was then removed under reduced pressure to obtain a polyorganosiloxane C.

EXAMPLE 6

A stirring bar was placed in a round-bottom flask, and 2.0 g of toluene, 8 g of H-PDMS (5-7% H, 65000 MW), 0.46 g of diethoxymethylvinylsilane, 0.55 g of triethoxyvinylsilane and 1 mg of $PtO_2$ (average diameter of particle is 20 μm: the smallest particle size is approximately 0.5 μm in diameter and the largest particle size is approximately 50 μm in diameter) catalyst were added to the flask. The reaction was conducted at 80° C. for 12 hours with stirring. The platinum oxide catalyst was removed by centrifugal separation at 2,000 rpm for 10 minutes, and toluene was then removed under reduced pressure to obtain a polyorganosiloxane D.

Resins A, B, C and D prepared in Examples 3-6 were charged in a package up to the uppermost level thereof, and cured at 150° C. for 7 hours. The package used was a Cu substrate package with a dent of 8 mm diameter covered with 1 mm thick Ag plating.

The package was subjected to hygroscopic treatment under 85° C. and 85% RH condition for 12 hours, and then set on a 260° C. hot plate for 10 seconds. Presence or absence of peeling between the resin and the package was visually checked using a microscope. The results are shown in FIG. 6, Table 1.

Generally speaking, a linear polyorganosiloxane without any condensable functional group like alkoxysilyl group, does not become an elastic resin merely by heating. However, the curable crosslinked polyorganosiloxane of the invention becomes an elastic resin simply by heating through thermal equilibration of siloxane bond (decomposition and rebonding reaction of a siloxane bond). In particular, where a high molecular weight linear polyorganosiloxane is used as a raw material, a molecular weight is increased by small numbers of rebondings and/or crosslinking reaction, and as a result, curing is liable to occur.

From the results, (See FIG. 6) the resins A and B of the invention have strong adhesion to a metal package as compared with the resins C and D that have a condensable functional group and this makes resins A and B suitable for an encapsulating material of LED. The reason for this phenomenon is now under investigation, but hydroxyl group generated during the thermal equilibrium reaction most likely plays an important role at the interface of the resin and the metal package.

EXAMPLE 7

4 parts by weight of silica fine particles (RX200, a product of Nippon Aerosil Co., Ltd.), 16.2 parts by weight of blue phosphor $Ba_{0.7}Eu_{0.3}MgAl_{10}O_{17}$ (particle diameter: 15 μm; hereinafter referred to as "BAM"), 1.5 parts by weight of green phosphor $Ba_{0.75}Sr_{0.25}SiO_4$:Eu (particle diameter: 16 μm; hereinafter referred to as "BSS") and 1.1 parts by weight of red phosphor $Sr_{0.8}Ca_{0.2}AlSiN$:Eu (particle diameter: 12 μm; hereinafter referred to as "SCASN") were mixed with 100 parts by weight of the resin A obtained in Example 1, and the resulting mixture was kneaded with a stirring device (AR-100), a product of THINKY, for 3 minutes to make a curable composition E of the invention.

EXAMPLE 8

4 parts by weight of silica fine particles (RX200, a product of Nippon Aerosil Co., Ltd.), 16.2 parts by weight of blue phosphor BAM, 1.5 parts by weight of green phosphor BSS and 1.1 parts by weight of red phosphor SCASN were mixed with 100 parts by weight of the resin B obtained in Example 2, and the resulting mixture was kneaded with a stirring device (AR-100), a product of THINKY, for 3 minutes to make a curable composition F of the invention.

EXAMPLE 9

6 parts by weight of silica fine particles (RX200, a product of Nippon Aerosil Co., Ltd.), 16.5 parts by weight of blue phosphor BAM, 1.5 parts by weight of green phosphor BSS and 1.1 parts by weight of red phosphor SCASN were mixed with 100 parts by weight of the commercially available addition-curing silicone resin (KER2500, a product of Shin-Etsu Chemical Co., Ltd.), and the resulting mixture was kneaded with a stirring device (AR-100), a product of THINKY, for 3 minutes to make a curable composition G of the invention.

The curable compositions (phosphor pastes) E, F and G made in Examples 7-9 were used to prepare white LED devices of near ultraviolet excitation. The LED package depicted in the Example 6 with a light-emitting diode having an emission wavelength of 403 nm (C405XB900, a product of Cree Inc.) wire-bonded to the bottom center of the package was filled up with each of the phosphor pastes E, F and G. Packages with E and F were cured at 150° C. for 7 hours, and that with G was cured at 100° C. for 1 hour, and then cured at 150° C. for 5 hours.

350 mA current was passed through the white LED obtained above at 25° C. to measure the total light flux, and 350 mA current was then passed through the same in an atmosphere of 85° C. and 85% RH to conduct accelerated deterioration test for 500 hours. Thereafter, 350 mA current was again passed through the white LED at 25° C. to measure the total light flux after the test, and its retention rate was calculated. The results are shown in FIG. 7, Table 2.

As is apparent from above, when the curable composition of the invention is used, white LEDs have less decrease of light emission intensity and higher reliability than LEDs with conventional silicone resins in Comparative Example 5 and 6.

The reason for this phenomena is considered to be that a conventional silicone resin with some metal catalyst turn its color under the strong near ultraviolet light irradiation from LED and high temperature, whereas the curable composition of the invention without metal catalyst stays colorless and transparent under these harsh condition.

The present application has been described using specific aspects of the invention. Additional descriptions of semiconductor light emitting devices, and LEDs in particular, as well as manufacturing methods therefore, and industrial applicability can be found in detail in European Patent No. WO2006090804 published Aug. 31, 2006, and also published as EP1854831 (A1), the specification of which is hereby incorporated herein in its entirety.

REFERENCES

1. US Patent Application Publication No. 2004/0063840
2. WIPO Publication No. WO2005/085303
3. Japanese Patent Document: JP-A-2002-203989
4. Japanese Patent Document: JP-A-2004-356506
5. U.S. Pat. No. 5,648,687
6. WIPO Publication No. WO2006/055456
7. U.S. Pat. No. 7,160,972
8. U.S. Pat. No. 6,204,523
9. U.S. Pat. No. 6,590,235

The invention claimed is:

1. A curable composition comprising a curable polyorganosiloxane and an inorganic phosphor fluorescence particle, wherein said curable polyorganosiloxane comprises a compound represented by the following formula in an amount of 50% by weight or more, and cures substantially in the absence of a hydrosilylation catalyst:

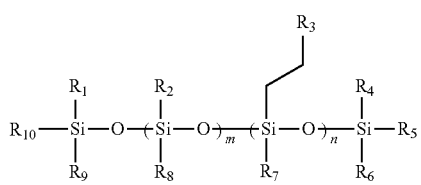

wherein R1, R2, and R4 to R10 each independently represent a group selected from hydride, alkyl, alkenyl, aryl and non-condensable silyl group, and R3 represents a non-condensable silyl group, m is an integer of 0 or more and n is an integer of 1 or more.

2. The curable composition of claim 1, that can be cured either by heating at a temperature of 80° C. or higher for an overall heating temperature of 1 hour or more.

3. The curable composition of claim 1, wherein the curable polyorgano siloxane is obtained by reacting a vinyl-containing compound (A) and a hydrosilyl-containing compound (B), wherein said compounds A and B are represented by the following general formulae:

wherein R11 is a non-condensable silyl group;

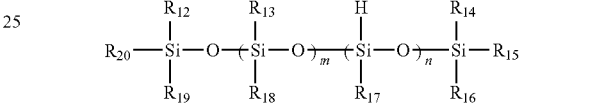

wherein R12 to R20 each independently represent a group selected from hydride, alkyl, alkenyl, aryl and non-condensable silyl group, m is an integer of 0 or more and n is an integer of 1 or more.

4. The curable composition of claim 3, wherein the vinyl-containing compound (A) and/or the hydrosilyl-containing compound (B) have a weight average molecular weight of 3,000 or more obtained by measuring with gel permeation chromatography using a polystyrene standard material in calibration curve measurement.

5. The curable composition in claim 3, wherein the compound (A) is selected from dimethyldivinylsilane, diethylmethylvinylsilane, methyltrivinylsilane, trimethylvinylsilane, and a compound having both a vinyl group and a structure that siloxane high molecular chains are extended to at least three directions with a center on its optional silicon atom.

6. The curable composition of claim 1, wherein the curable polyorganosiloxane can be obtained using a noble metal oxide as a catalyst.

7. The curable composition in claim 1, wherein the curable polyorganosiloxane does not substantially contain a noble metal component.

8. A semiconductor luminescent device comprising the silicone member in claim 7.

9. A silicone member obtained by curing the curable composition in claim 1.

10. The curable composition in claim 1, wherein the non-condensable silyl group in R3 is a group selected from a trimethylsilyl group and a group comprising a siloxane high molecular chain extending to at least three directions with a center on its optional silicon atom.

* * * * *

UNITED STATES PATENT AND TRADEMARK OFFICE
CERTIFICATE OF CORRECTION

PATENT NO. : 7,943,719 B2  
APPLICATION NO. : 12/072853  
DATED : May 17, 2011  
INVENTOR(S) : Craig J. Hawker et al.

It is certified that error appears in the above-identified patent and that said Letters Patent is hereby corrected as shown below:

On the Title Page

Item (75) Inventors:

Please change the name "Kenichi Takizawa Kitakyushu (JP)" to read --Kenichi Takizawa, Fukuoka-ken (JP)--

Please change the name "Yutaka Moti, Kitakyushu (JP)" to read --Yutaka Mori, Fukuoka-ken (JP)--

Signed and Sealed this  
Fourteenth Day of April, 2015

Michelle K. Lee  
*Director of the United States Patent and Trademark Office*